United States Patent [19]

Turlej et al.

[11] 4,238,675
[45] Dec. 9, 1980

[54] OPTICS FOR INFRARED INTRUSION DETECTOR

[75] Inventors: Zbigniew W. Turlej, Mississauga; Donald F. Hawken, Toronto, both of Canada

[73] Assignee: Isotec Industries Limited, Toronto, Canada

[21] Appl. No.: 48,684

[22] Filed: Jun. 14, 1979

[51] Int. Cl.³ .................................................. G01J 1/00
[52] U.S. Cl. ..................................... 250/353; 250/342
[58] Field of Search ............... 250/338, 340, 342, 347, 250/353, 334; 350/288, 292, 293, 299; 340/541, 565, 567, 573

[56] References Cited

U.S. PATENT DOCUMENTS

| Re. 29,082 | 12/1976 | Schwarz | 250/338 |
|---|---|---|---|
| 3,703,718 | 11/1972 | Berman | 250/338 |
| 3,728,545 | 4/1973 | Abel | 250/334 |
| 3,886,360 | 5/1975 | Reiss et al. | 250/338 |
| 3,923,382 | 12/1975 | Harding | 250/353 |
| 3,958,118 | 5/1976 | Schwarz | 340/567 |
| 3,972,598 | 8/1976 | Kunz | 250/338 |
| 4,052,716 | 10/1977 | Mortensen | 340/567 |

Primary Examiner—Davis L. Willis

[57] ABSTRACT

An infrared intrusion detector has an optical system for gathering infrared radiation from discrete sensitive regions and focusing such received radiation onto an infrared radiation sensor. The detector includes a monitoring device to sound an alarm when radiation sensed reaches a predetermined level. The optical system comprises an optical collector for gathering radiation from a field which includes the sensitive regions and for converging such radiation onto a plurality of reflectors. Each reflector determines one of the discrete sensitive regions and, in turn, is oriented to reflect converging radiation gathered from a sensitive region on the detector. The invention provides a simple, efficient optic system for a broad field of gathering infrared radiation, concentrating and focusing it in a manner to provide sufficient levels of received radiation for purposes of detection.

21 Claims, 7 Drawing Figures

OPTICS FOR INFRARED INTRUSION DETECTOR

Field of the Invention

This invention relates to infrared intrusion detectors and more particularly to optical systems for such detectors.

BACKGROUND OF THE INVENTION

In the field of passive types of infrared intrusion detectors, that is, detection being based upon receiving infrared radiation emitted by an intruder, several approaches have been taken to provide for reliable detection. It has been very common to use various types of curved mirrors, particularly concavely curved mirrors, to gather infrared radiation and focus it directly onto an infrared radiation sensor. An example of such mirror arrangement is shown in United States Pat. No. 3,703,718. In order to gain detection of a broad field and establish several sensitive regions in that field, the curved mirror is made of various segments which receive radiation from various discrete, spaced-apart sensitive areas and directly reflect the radiation onto the sensor.

A similar type of mirror arrangement, in terms of segmenting the curved mirror portion of the reflector arrangement is shown is United States Pat. No. 3,886,360. In one of the embodiments, the mirror arrangement requires three reflections before the radiation is concentrated onto the infrared radiation sensor.

Other types of multi-faceted mirrors for use in infrared radiation detectors are disclosed in United States Pat. Nos. 3,923,382 and 3,972,598. The purpose of the multi-faceted curved mirror is to gather radiation from several spaced-apart discrete fields of view and focus the radiation onto a single sensing element.

With most intrusion detectors, detection is based upon movement of the intruder through various sensitive regions such as described in United States Pat. Nos. RE. 29,082 and 4,052,716. In each instance, a concave mirror is used to directly reflect gathered radiation from a field of detection onto a detector which has an array of detection points to establish movement of the intruder across the field of detection.

Other approaches to establishing broad fields of detection, which may or may not employ optic lenses, is disclosed in United States Pat. No. 3,958,118. Movement of the intruder through the various fields of detection is needed in order to set off the alarm. In this particular instance, there is sequential directing of radiation onto the group of detectors as the body passes through the field. Such movement of sensed radiation across the detector face sets off an alarm.

In most of the above arrangements, in order to provide a broad field of detection, the unit becomes relatively large and, in some instances, of little use other than in an industrial or military application. Further, in providing a broad field of sensitive areas in intrusion detection, most of the above systems require segmenting of the curved mirror which reduces the amount of radiation which can be gathered from any one sensitive region given the constraints on total system size.

It is, therefore, an object of this invention to provide a compact, infrared radiation intrusion detector which is economical to manufacture, useful in domestic, industrial military applications and has a relatively broad multiple field of detection.

SUMMARY OF THE INVENTION

The advantages of this invention are realized in an optical system for gathering infrared radiation from several discrete, spaced-apart sensitive regions and focusing it onto an infrared radiation sensor. The system comprises an optical collector for gathering infrared radiation from a space including such sensitive regions and for converging such radiation from the space onto a plurality of reflectors. Each reflector determines a discrete, sensitive region and, in turn, is oriented to reflect the converging radiation gathered from a corresponding discrete sensitive region onto an infrared radiation sensor.

According to an aspect of the invention, the optical collector may be an optic lens or concavely curved mirror which converges the radiation onto an array of a plurality of reflectors. The reflector may be a planar mirror, which in determining a sensitive region, reflects infrared radiation from that region onto an infrared radiation sensor.

The compactness of the device is realized in the combined use of the optical collector/converger and plurality of reflectors, where the reflectors provide the discrete regions of sensitivity and the collectors determine the breadth of the field. The use of the reflectors permits positioning of the sensor intermediate the optical collector and reflectors.

BRIEF DESCRIPTION OF THE DRAWINGS

Preferred embodiments of the invention are shown in the drawings wherein.

DETAILED DESCRIPTION OF THE PREFERRED EMBODIMENTS OF THE INVENTION

Figure 1:
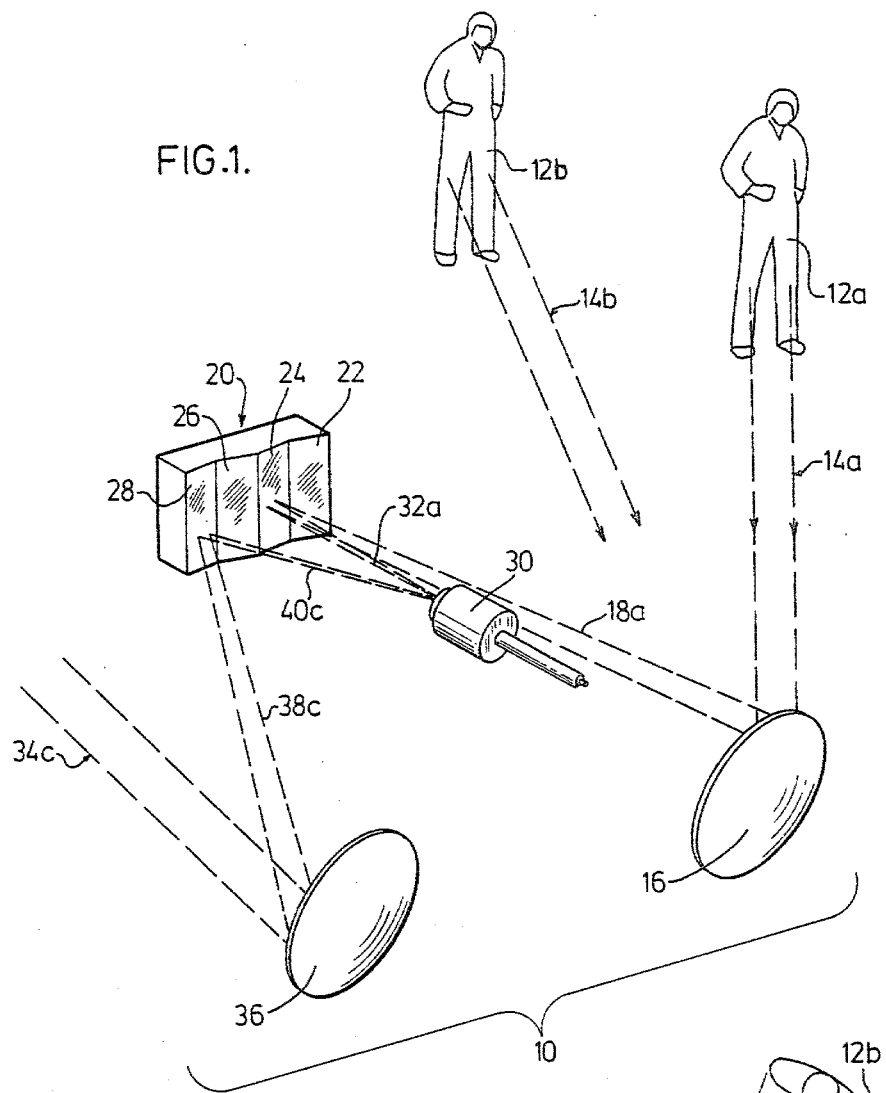
FIG. 1 shows a preferred arrangement for an optical system adapted for use in an intrusion detector.

An optical system 10 adapted for use with an infrared intrusion detector is shown in FIG. 1. An intruder 12 is shown in positions a and b which are sensitive or detection regions. The infrared radiation emitted from the body of the intruder propagates towards the optic system 10 along paths generally designated 14a and 14b. The optic system 10 includes an optical collector 16 which converges the received radiation along path 18a onto an array of optical reflectors 20.

The array of optical reflectors is, in this instance, made up of four planar mirrors 22, 24, 26 and 28. Each of the reflectors is oriented differently to an adjacent reflector. Reflector 24 determines the sensitive region where intruder 12a is and, in turn, is oriented to reflect along path 32a the converging radiation onto the infrared radiation detector 30.

Similarly although not shown, an intruder emitting radiation along path 34c is focused onto the detector 30 by another optical collector 36 which converges the radiation onto the reflector array 20 along path 38c. In this instance, reflector 28 reflects the converging radiation along path 40c onto the sensor 30.

The sensor 30 may be any type of suitable infrared sensor, such as pyro-electric, thermopile or thermistor type. As appreciated by those skilled in the art, the radiation to be sensed, in terms of intruders, varies roughly between 7 and 15 microns. In particular, a human body emits infrared radiation peaked at a wavelength of approximately 9 microns. The signal from the sensor 30 is electronically processed and monitored in a manner to cause an alarm when the intensity of the received radiation and the frequency or occurrence of the radiation level is such to correspond with that of an intruder. As can be appreciated, the electronics, in terms of sensing, are tuned to substantially reduce the generation of false alarms due to slow increases in radiation, such as room heating and the like. The electrical sensing of the radiation will be discussed in more detail with respect to the block diagram of FIG. 7.

Figure 2:
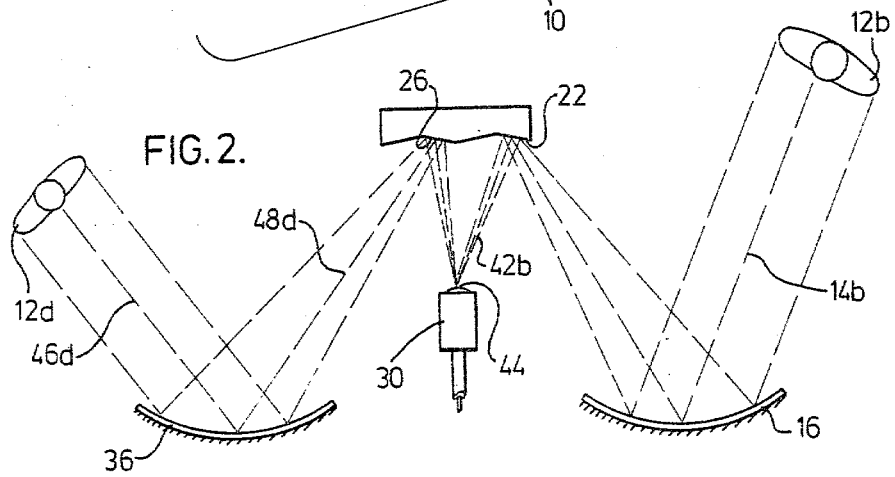
FIG. 2 is a top view of the optic system of FIG. 1.

Turning to FIG. 2, the paths of radiation, as collected and reflected by the optic system 10, are shown where the intruder 12b is in position and a new position for an intruder 12d is shown. Due to the particular positioning of reflector 22, the infrared radiation from intruder 12b, as transmitted along a path 14b, is collected by curved mirror 16 and converged onto the reflecting surface 22. The focal point of mirror 16 is such that the reflected converging radiation along path 42b is focused onto the sensor portion 44 of detector 30.

The radius of curvature of the mirror 16 has been accentuated for purposes of illustration. It is appreciated, however, that the curvature of the mirror 16, should it be spherical, would have a radius equal to twice the summation of the distances from mirror 16 to the planar mirror 22 and from mirror 22 to detector surface 44. Thus, the focal point for the curved mirror 16 is proximate or exactly at receiver surface 44. As to intruder 12d, his radiation transmitted along path 46d is collected by mirror 36 and converged along path 48d onto mirror 26, which is arranged to reflect the converging radiation onto the receiver portion 44.

As demonstrated in FIGS. 1 and 2, the arrangement for the optical system is such that in collecting and reflecting the radiation onto the sensor 30, in no way does the position of the sensor interfere with the transmission of the received and focused radiation. As more clearly shown in FIG. 1, the reflector array 20 is arranged such that it reflects the radiation slightly upwardly to converge on the sensor 30 as it is positioned somewhat above the array 20. This prevents the sensor 30 from interferring in any way with the radiation as converged onto the reflector by the gathering mirrors 16 and 36.

The array of reflectors 20, in combination with the collector optics, determines the number and location for the detection areas in a particular field. It is apparent that, considering one side of the system, a single optic collector is provided to collect infrared radiation from all areas in a field which includes the regions to be sensed. That radiation is converged towards the reflector arrangement 20, where any radiation which does not land on one or more of the reflectors is, in turn, not focused onto the sensor device 44, hence the establishment of the discrete, spaced-apart sensitive regions of detection. The mirror array 20 provides in a very simple manner a plurality of regions of detection, while relying on an easily constructed optic collector, such as spherical mirror or convex lens. The system also provides for adjusting the optic collector position or angle to select a desired space of detection which contains the discrete spaced-apart sensitive regions.

In considering both sides of the optic system 10, it is apparent that there is a set of reflectors in the array 20 for each radiation collector; i.e., reflectors (22, 24) and (26, 28) constitute the sets for collectors 16 and 36 respectively. For each set, a particular reflector is oriented differently from adjacent ones to thereby provide the regions of detection.

The reflector array 20 also provides the aspect of a compact form of intrusion detector. As can be appreciated, without the reflectors, the collector optics would require positioning of the sensor at its focal point which would be equidistant on the other side of array 20. Therefore, the reflector permits a close inverted positioning of the detector relative to radiation optic collectors. As can be appreciated, by providing the correct radius of curvature for the collectors, should it be spherical, the detector may be positioned approximately midway between the reflector array and the radiation collectors.

The size of the discrete, spaced-apart sensitive regions is dependent upon the shape of the receiving area 44 of the detector 30. According to a preferred embodiment of this invention, the shape of the detector opening 44 may be rectangular to provide at approximately 30 feet a sensitive or detector region of roughly one-half a foot wide by three-quarters of a foot high. In providing a higher than wider sensitive region, the detector is, therefore, less sensitive to vertical movement due to rising heat from a heater or the like.

It is also appreciated, of course, that inwardly of a distance of 30 feet, the sensitive regions get progressively smaller; however, this is satisfactory due to the fact that the closer the intruder is to the detector, the greater the intensity of radiation and the closer the spacing between sensitive regions.

The tilting of the reflector elements of the array 20, and in combination with positioning of the radiation collectors, provides various areas for detection. In a room, for example, it may be desirable to detect intruders along the floor, along normal height and perhaps along certain portions of the ceiling where there may be skylights or the like which permit entry from above.

Figure 3:
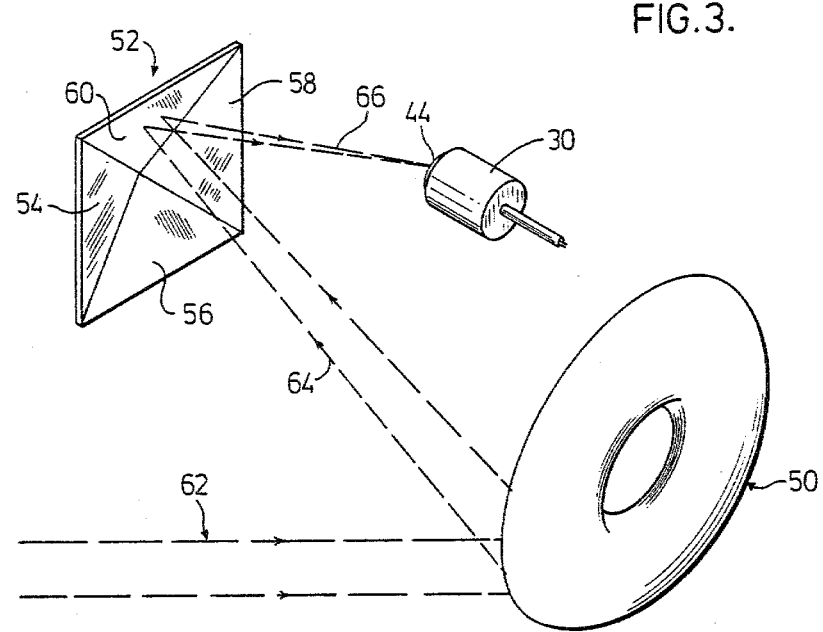
FIG. 3 shows an alternative embodiment for the optic system for an infrared intrusion detector.

An arrangement, which is an extension of the device of FIG. 2, permits detection of several areas by using only a single collection device, as shown in FIG. 3. The radiation collection device, generally designated 50, is ring-shaped and has on its inner surface an annular continuous concave reflector. Thus, the collector 50 may collect radiation from fields or a field all about the detector, regardless from where radiation enters. The reflector array 52 determines which portions in that field are set up as sensitive regions, where the reflector array, in this instance, has four reflecting surfaces, 54, 56, 58 and 60, which divide the array into four quadrants, thus providing four sensitive regions which would be upper and lower and side-by-side. As shown in FIG. 3, radiation transmitted along a path generally designated 62 enters from the bottom area of the field and is collected at the base of the collector 50 and converged along path 64 onto planar reflector 60 which, in turn, reflects the converging beam 66 onto the receiving area 44 of detector 30. Thus, in a simple, uncomplicated manner, sensitive areas may be established over several regions in a field to provide detection. All the regions are predetermined not by collector 50, but instead by the reflector array 52 which, in this instance, consists of planar mirrors and may be set up easily in various attitudes to establish the necessary regions of sensitivity.

Figure 4:
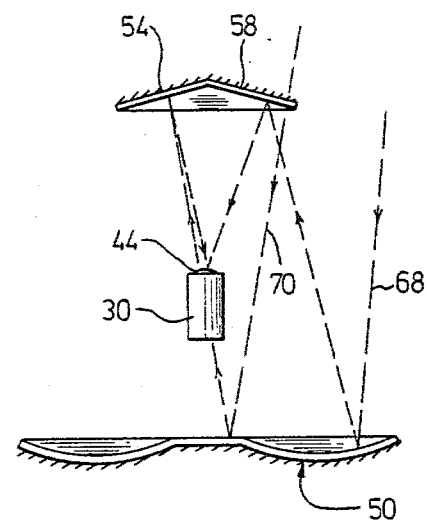
FIG. 4 is a top view in section of the optic system of FIG. 3.

As shown in FIG. 4, a section through the collector 50 shows where radiation, entering along path 68, is collected and converged onto reflector 58 and, in turn, focused on sensitive area 44 of detector 30. Similarly, radiation entering along path 70 is reflected by surface 54 and converged on the detector surface 44 in the manner shown. With these arrangements as preferred for the optical system, it can be appreciated that there is now afforded a very flexible system in establishing sensitive regions for detection in a simple, economical manner. Depending upon the number and orientation of the reflector elements, a plurality of sensitive regions may be established and which may surround an area to be protected.

Figure 5:
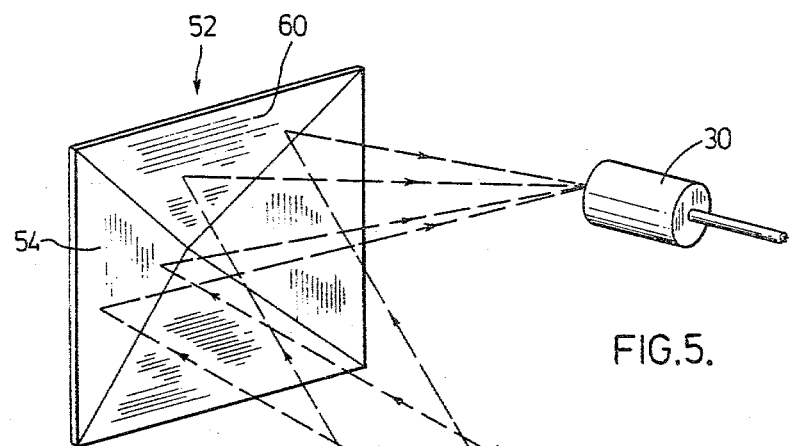
FIG. 5 shows in more detail the reflector array of the optic system.

Turning to FIG. 5, the reflector array 52 for the system is shown in more detail. Radiation entering along the path 72, as collected by the collector, is reflected off the upper quadrant 60 and converges onto the detector 30. Similarly, radiation entering from another direction along path 74, as converged by the collector 50, is reflected off surface 54 onto the detector. It can be appreciated that, with the array 52, the quadrants may be broken up into smaller segments to establish further sensitive regions about the upper, lower and side-by-side areas and may approach a polygonal-shaped peripheral field of detection.

The radiation collectors are such that they are able to collect radiation from a very broad field, which includes, of course, all of the sensitive regions as determined by the reflector array. By using the shapes shown for the collectors or changing their shapes, it is appreciated that the system may be adapted for use in domestic, industrial and military situations.

Figure 6:
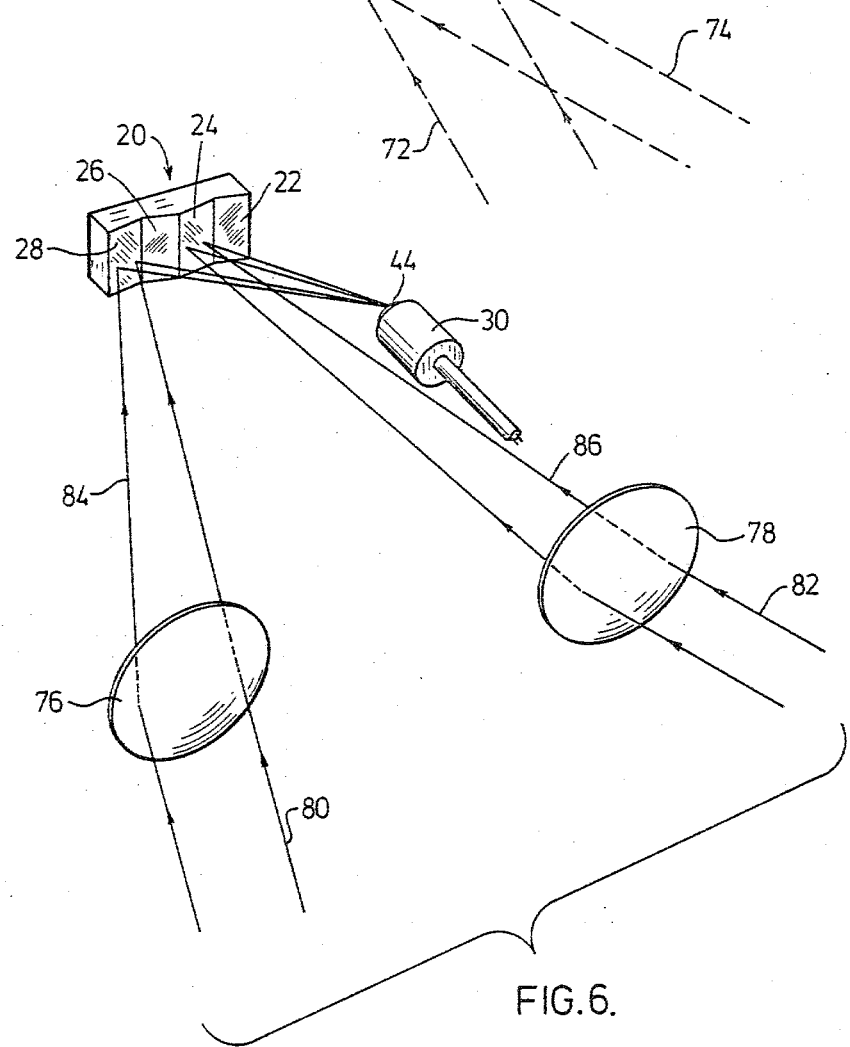
FIG. 6 shows an alternative embodiment for the optic system of the invention.

The advantages of this invention, in terms of using a reflector array to establish a sensitive region can also be incorporated with optical collectors which employ a lens to concentrate or converge received radiation. As shown in FIG. 6, a pair of convex lenses 76, 78 converge received radiation along paths 80, 82 onto the reflector array 20 which has the individual elements 22, 24, 26 and 28. In this instance, lens 76 converges the radiation along path 84 onto mirror 28, which reflects it back to the sensitive area 44 of detector 30. Similarly lens 78 converges radiation along path 86 onto the reflector surfaces 24 which correspond to the sensitive region from which the radiation is emitted and, in turn, reflects it onto the detector 30.

Figure 7:
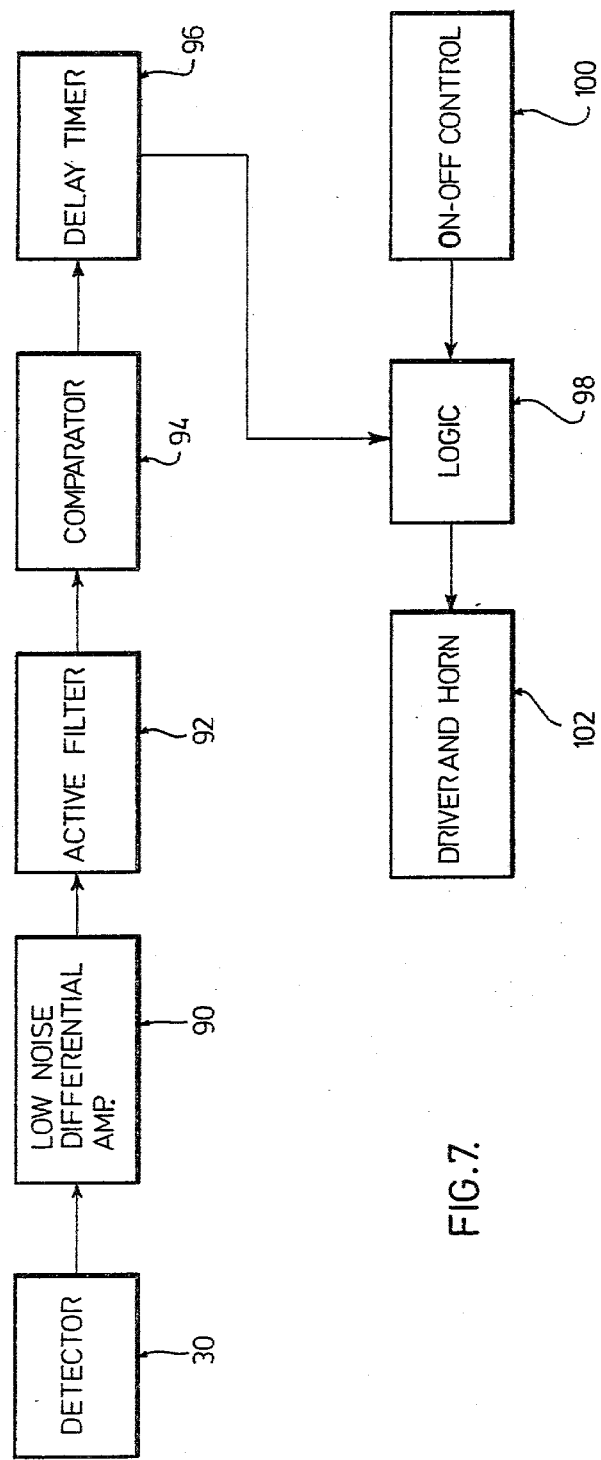
FIG. 7 is a block diagram of detector monitor components.

As can be appreciated, various electronic arrangements may be employed which are connected to the detector 30 and which sound an alarm, or cause an alarm, when the relative degree of radiation has reached a predetermined level. The electronics may be such to sense movement through one or more of the sensitive regions. As shown in FIG. 7, a block diagram of the electronic components is shown. The detector 30 has its generated signal transmitted to a low noise differential amplifier 90 which amplifies the signal received from the detector 30. The amplified signal is transmitted to the active filter 92 which filters the amplified signal to pass the specified frequency corresponding to that which would be generated by an intruder entering one or more of the sensitive regions. The filtered signal is fed to the comparator 94 where the amplitude of the signal is compared. The comparator 94 generates a pulse which is fed to the delay timer 96 when the amplitude is above that preset in the comparator 94. The delay timer 96 delays transmission of the pulse to the logic circuit 98 for a predetermined period of time. The purpose of the delay is that, should the owner of the intrusion detector wish to turn it off, he is permitted to enter the scanning region, locate the on/off controller 100 and turn the unit off. Therefore, the delay time by the timer 96 is such to permit a person knowing the proper sequence to turn off the device before the alarm 102, comprising driver and horn, is set off by the logic circuit 98. The on/off control system 100 may be something more complicated that a simple on/off switch and which can only be operated by the owner of the device who would have the particular combination or know the particular technique for turning off the unit.

Although not shown, it is appreciated that other arrangements may be chosen for the optic system in terms of the collector and reflectors. The collector devices, other than being lenses, may be in the form of parabolic-shaped mirrors or other curved shapes for mirrors which have the necessary curvature to provide a focal point at the sensor. Also, the reflector array 20 may be made up of multi-faceted planar arrays to determine the various sensitive regions. The complexity of the array will be determined, of course, by its end use where for domestic purposes four sensitive regions would be suitable. The reflector arrays themselves may, if cost permits, be of a curved nature of individual facets to effect a further focusing of the converging radiation onto the detector, should a more compact arrangement be desired.

The optical system, according to this invention is, therefore, capable in a simple manner of gathering greater amounts of radiation over extended fields in a more compact arrangement compared to prior art devices. The several areas of sensitive regions are dependent upon the number of mirrors involved in the reflector array, resulting in no need to segment or break up the optical collectors. Further, the reflector array, in combination with the collector optics, provides better infrared radiation gathering capabilities than existing prior art for such a compact device.

The radiation gathering capabilities of this compact unit are sufficient to permit the use of a thermopile in the detection of intruders. Normally thermopiles require relatively high concentrations of radiation in order to properly function, whereas the more sensitive pyro-electric devices do not require as high a concentration of radiation. However, the thermopile devices are less expensive and, therefore, the optical system of this invention is more suited to the economic manufacture of an intrusion detector.

The reflector array also provides greater flexibility in design in terms of the capability of adding any number of desired sensitive regions. From a single collector surface, multiple regions may be established as determined by the number of facets in the reflector array.

To reduce the amount of energy losses in reflection, the mirrors may be plated with a high reflectivity material. For domestic application, it may be possible to plastic injection mold the bases for the mirrors and plate the plastic with highly reflective materials, such as gold-chromium. Plating may be accomplished by electro-deposition or vacuum emission deposition.

Although various preferred embodiments of the invention have been described herein in detail, it will be understood by those skilled in the art that variations may be made thereto without departing from the spirit of the invention of the scope of the appended claims.

The embodiments of the invention in which an exclusive property or privilege is claimed are defined as follows:

1. In an infrared intrusion detector, an optical device to direct gathered infrared radiation from several discrete, spaced-apart sensitive regions onto an infrared radiation sensor, said device comprising an optical collector for gathering infrared radiation from a space including such sensitive regions and for converging such radiation from a space onto a plurality of reflectors corresponding in number to the number of sensitive regions where each reflector determines a discrete sensitive region and, in turn, is oriented to reflect converging radiation from a corresponding discrete sensitive region onto said infrared radiation sensor 2. In an infrared intrusion detector of claim 1, said optical collector being a concave mirror.

3. In an infrared intrusion detector of claim 1, said optical collector being a convex lens.

4. In an infrared intrusion detector of claim 1, each reflector being a planar mirror oriented differently from adjacent planar mirrors to thereby determine said discrete, spaced-apart sensitive regions.

5. In an infrared intrusion detector of claim 4, said optical collector in combination with said plurality of reflectors corverging radiation to a point located between them, where a radiation sensor is positionable.

6. In an infrared intrusion detector of claim 1, said optical collector having a focal point for reflected converging radiation between said optical collector and said plurality of reflectors, an infrared radiation sensor being positionable proximate said focal point.

7. In an infrared intrusion detector of claim 6 or 5, said reflectors being oriented to permit locating said sensor in a position which is non-interfering with converging beams of radiation.

8. In an infrared intrusion detector of claim 1, a spaced-apart pair of said optical collectors, each to a side of an infrared radiation detector, sets of plurality of reflectors, each set associated with an optical collector to reflect converging radiation from corresponding discrete sensitive regions corresponding in number to the number of reflectors in each set onto said infrared radiation detector.

9. In an infrared intrusion detector of claim 8, each optical collector being a concave mirror.

10. In an infrared intrusion detector of claim 9, said concave mirror being a spherical mirror.

11. In an infrared intrusion detector of claim 1, said optical collector being a ring having an annular reflective concave surface, said plurality of reflectors being positioned in quadrants to define discrete sensitive regions in each of four areas.

12. In an infrared intrusion detector of claim 11, a planar mirror positioned in each quadrant for the reflector arrangement.

13. In an infrared intrusion detector of claim 11, said reflectors being arranged to define sensitive regions in upper and lower areas and side-by-side areas.

14. System of mirrors for use with an infrared intrusion detector having an infrared radiation sensor, said mirror system receiving an infrared radiation from several discrete, spaced-apart detection regions and focusing such received radiation into an infrared sensor, said mirror system comprising a concavely curved mirror for receiving infrared radiation from an area which includes such regions of detection, and converging such received radiation from such area onto an array of planar mirrors, each planar mirror providing a predetermined discrete detection region as radiation is converged towards the array of mirrors, said planar mirror being positioned to reflect radiation received from a corresponding detection region onto an infrared radiation sensor, said concavely curved mirror having a focal point proximate the receiving portion of an infrared radiation sensor.

15. A system of claim 14, wherein said concavely curved mirror is a spherical mirror having a radius of curvature equal to double the distance the radiation travels in reflection from spherical mirror to planar mirror to sensor.

16. A system of claim 14, wherein each planar mirror is oriented differently from adjacent planar mirrors to thereby define such discrete, spaced-apart detection regions.

17. A system of claim 14, wherein there is a pair of spaced-apart concavely curved mirrors, each being offset relative to an infrared radiation detector, sets of a plurality of planar mirrors in the array, each set associated with a corresponding curved mirror to reflect focused radiation received from a corresponding discrete detection region onto an infrared radiation detector.

18. A system of claim 17, wherein each concave mirror is a spherical mirror.

19. A system of claim 14, wherein said concavely curved mirror is a ring having an annular reflective concave surface, said array of planar mirrors being positioned in quadrants to define discrete detection regions in each of four areas.

20. A system of claim 19, wherein a planar mirror is positioned in each quadrant of the array.

21. A system of claim 19, wherein said array of planar mirrors is arranged to define sensitive regions in upper and lower areas and side-by-side areas of the space in which instrusion is to be detected.

* * * * *